Sept. 10, 1929.  G. F. PHILLIPS  1,727,356
MOTION PICTURE APPARATUS
Filed Dec. 8, 1927
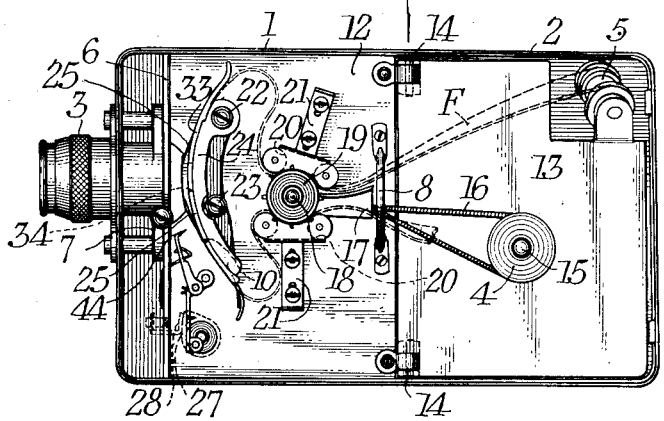
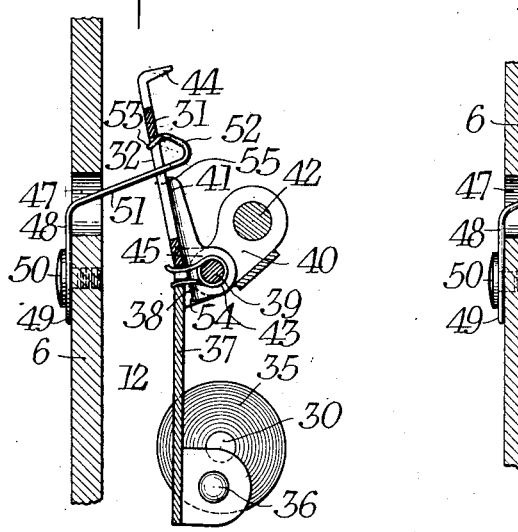
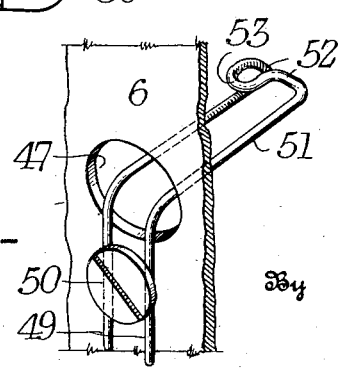
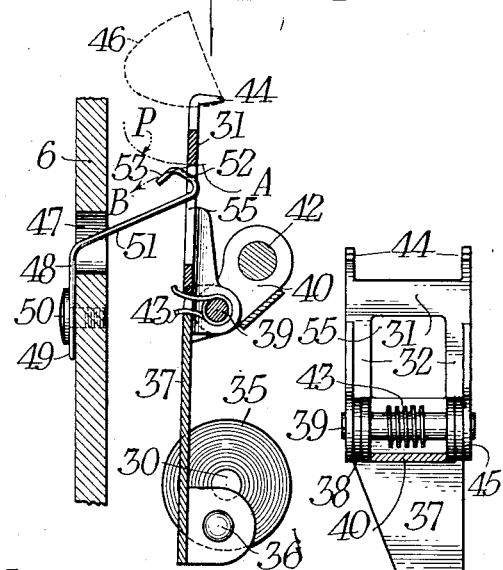
Inventor,
George F. Phillips, Patented Sept. 10, 1929.

1,727,356

UNITED STATES PATENT OFFICE.

GEORGE F. PHILLIPS, OF ROCHESTER, NEW YORK, ASSIGNOR TO EASTMAN KODAK COMPANY, OF ROCHESTER, NEW YORK, A CORPORATION OF NEW YORK.

MOTION-PICTURE APPARATUS.

Application filed December 8, 1927. Serial No. 238,620.

This invention relates to motion picture apparatus and more particularly to a device applicable to a pulldown of the claw type to keep the claws out of engagement with the film during threading. This invention is in certain of its aspects a specific form of the invention generically claimed in the application of E. E. Underwood, Serial No. 28,006, filed May 4, 1925.

A further object is to provide such a device which will be automatically released when the mechanism is started.

Other objects and advantages will appear from the following specification, reference being made to the accompanying drawings in the several figures of which the same characters indicate the same parts, Fig. 1 is a side view of a motion picture camera with the side cover removed;

Fig. 2 is a sectional view of the claw pull down, engaged by the device;

Fig. 3 is a section view of the claw disengaged from the device;

Fig. 4 is a fragmentary perspective view of the device;

Fig. 5 is a face view of the claw mechanism.

The invention is illustrated as applied to a camera of the type disclosed in the patent to Stuber and Underwood, No. 1,548,960, granted Aug. 11, 1925, comprising a casing 1, one side of which is a removable cover. Fig. 1 shows the camera open and without this cover which normally fits into the flanged edges 2. The casing has the customary objective mount 3, a shutter casing 7 carried by a transverse partition 6. A longitudinal partition 12 fixed in the front half of the camera carries a rear partition 13, hinged thereto at 14 and carrying a shaft 15 for a take-up reel, this shaft carrying a pulley 4 driven by a spring coil belt 16 passing under guide 17 to a driving pulley (not shown) on shaft 18 journaled in partition 12 and carrying sprocket 19 against which the film F is held by rollers 20 carried on the slides 21, as it passes from roller 5, directing it from a reel, not shown, mounted behind partition 13, to the gate and thence to a take-up reel on shaft 15, being additionally guided by the guide 8.

Partition 12 carries two fixed lugs 22 and 23 upon which is seated a removable gate member 24, against which bears the guide member 33, the latter being held resiliently in place by springs 25. The two members 24 and 33 are curved and constitute a guide for the film past the exposure area 34 which is directly behind the lens. In the presser member 33 is a slot indicated at 10 for the passage of a claw 44.

The pulldown mechanism is driven from a motor, not shown, by means of a shaft 30 passing through partition 12, and carrying a disc 35 to which is eccentrically pivoted at 36 an elbow member 37, having at its other end ears 38 through which passes pintle 39 upon which is pivoted link member 40 and claw member 41, the latter having ears 45 surrounding the pintle 39. The link 40 is pivoted on fixed lug 42 carried by partition 12. A spring 43 coiled around pintle 39 engages the members 37 and 41 to press member 41 toward the gate, its movement being limited by stops 54 on ears 45. The member 41 has on its outer end claws 44, the path of which is indicated at 46, and has cross bands 31 and side bars 32 forming a large central opening 55.

On shaft 30, behind partition 12 is a lug 27 engageable by a catch member 28 to stop the mechanism at the point of its cycle indicated in the figures, that is, with the claw at the end of its pulldown stroke and just about to move away from the film.

In the transverse partition 6 is an aperture 47 through which extends a hook member 48 consisting of a strand of wire doubled upon itself with its ends 49 secured by screw 50. This hook has a forwardly extending part 51 and a sharply reversed inclined portion 52 with a final inturned end 53 where the wire is doubled back.

This hook is so positioned that it extends through the opening 55 of the claw member during the movement of the latter without interference. When the claw is at rest, the member 41 may be thrust back about pivot 39 the lower edge of the upper cross bar 31 describing the arc A—B and camming the hook down, so that the claw arm 40 is latched in the position shown in Fig. 2.

It is thus held out of the gate during the threading of the film. The user need not restore the claw to operative position before closing the camera, since, upon starting the mechanism, the first motion will lift the claw arm from engagement with the latch hook and it will be pressed forward into its usual path by spring 43. The normal path of movement of the lower edge of the cross bar is indicated at A—P. When in normal operation it does not engage the latch. If in engagement with the latch it will upon starting rise until it reaches its normal path leaving the latch free.

The two members 37 and 41 together constitute a resilient claw arm having a normal shape as shown in Fig. 3, from which it may be flexed and to which it will return by resilient action.

Numerous other embodiments are possible and I contemplate as included within my invention all such modifications and equivalents as fall within the scope of the appended claims.

Having thus described my invention, what I claim as new and desire to secure by Letters Patent is,—

1. In motion picture apparatus, a structure constituting a guideway for a film band, mechanism including a film engaging member having a normal path of movement traversing said guideway for engaging and advancing a film therethrough, said film engaging member only being manually movable out of its normal path of movement, and a latch member positioned at a distance from said guideway and automatically engageable by said film engaging member when moved out of its normal path, whereby the film engaging member may be held away from the guideway.

2. In motion picture apparatus, a structure constituting a guideway for a film band, mechanism including a film engaging member having a normal path of movement traversing said guideway for engaging and advancing a film therethrough, said film engaging member only being manually movable out of its normal path of movement, and a device positioned away from the guideway in a position to engage and hold the film engaging member only when out of its normal path.

3. In motion picture apparatus, a structure constituting a guideway for a film band, mechanism including a film engaging member having a normal path of movement traversing said guideway for engaging and advancing a film therethrough, said film engaging member only being manually movable out of its normal path of movement, and a resilient hook with an inclined cam end positioned to be engaged automatically by said film engaging member when the latter is moved out of its normal path and to hold said member out of the guideway.

4. In motion picture apparatus, a structure constituting a guideway for a film band, mechanism including a film engaging member having a normal path of movement traversing said guideway for engaging and advancing a film therethrough, said film engaging member only being manually movable out of its normal path of movement, and a latch member positioned at a distance from said guideway and automatically engageable by said film engaging member when moved out of its normal path, whereby the film engaging member may be held away from the guideway, and automatically disengageable from said film engaging member upon movement of the mechanism.

5. In motion picture apparatus, a structure constituting a guideway for a film band, mechanism having a cycle of movement and including a member having a normal path of movement traversing said guideway for engaging and advancing a film therethrough, said film engaging member only being manually movable out of said normal path, a device positioned to engage and hold said member out of its normal path and automatically disengageable from said member upon movement of the mechanism in its cycle.

6. In motion picture apparatus, a guideway, mechanism including a resilient arm with a claw having a normal path of movement traversing said guideway for engaging and advancing a film therethrough said arm being capable of flexure to move the claw from its normal path, and a device positioned on the other side of the arm from the guideway in a position to engage and hold the arm with the claw out of its normal path.

7. In motion picture mechanism, a guideway, mechanism including a film engaging member having a normal path of movement traversing said guideway for engaging and advancing a film therethrough, said film engaging member being movable out of its normal path, means for stopping said mechanism in a definite position with the claw at a definite point in its path, a device positioned to engage and hold said member out of said path when the mechanism is at rest and automatically disengaging said member upon movement of the mechanism.

8. In motion picture mechanism, a guideway, mechanism including an arm with a film engaging claw having a normal path of movement traversing said guideway for engaging and advancing a film therethrough, said film engaging member being movable out of its normal path, means for stopping said mechanism in a definite position with the claw at a definite point in its path, a device positioned to engage and hold automatically said member when moved out of said path when the mechanism is at rest and automatically disengaging said member upon movement of the mechanism.

9. In motion picture apparatus, a guideway, a resilient claw arm having a cycle of movement and having a claw with a defined path of movement through said guideway, mechanism for moving said arm through said cycle, means for stopping said mechanism in a definiate position with the claw in and about to leave the guideway, the resilient arm being capable of flexure to move the claw from the guideway and a latch positioned in the path of a part of such arm when so flexed and automatically engaging the same to hold it out of the guideway.

10. In motion picture apparatus, a guideway, a resilient arm having a claw, mechanism for moving said arm and claw through a definite cycle of movement wherein the claw traverses the guideway, a stop member movable into the path of a part of the mechanism and thereby stopping the mechanism in that portion of its cycle when the claw is about to leave the guideway, the resilient arm being capable of flexure away from the guideway, and a latch positioned in the path of a part of such arm when so flexed and automatically engaging the arm to hold the claw out of the guideway, and automatically disengaging the arm upon movement of the stop member out of engagement with the mechanism.

Signed at Rochester, New York, this 2nd day of December, 1927.

GEORGE F. PHILLIPS.